Feb. 28, 1967  YOSHIO GOTO  3,306,627
RIDER-PROPELLED EXERCISING VEHICLE
Filed Feb. 1, 1965
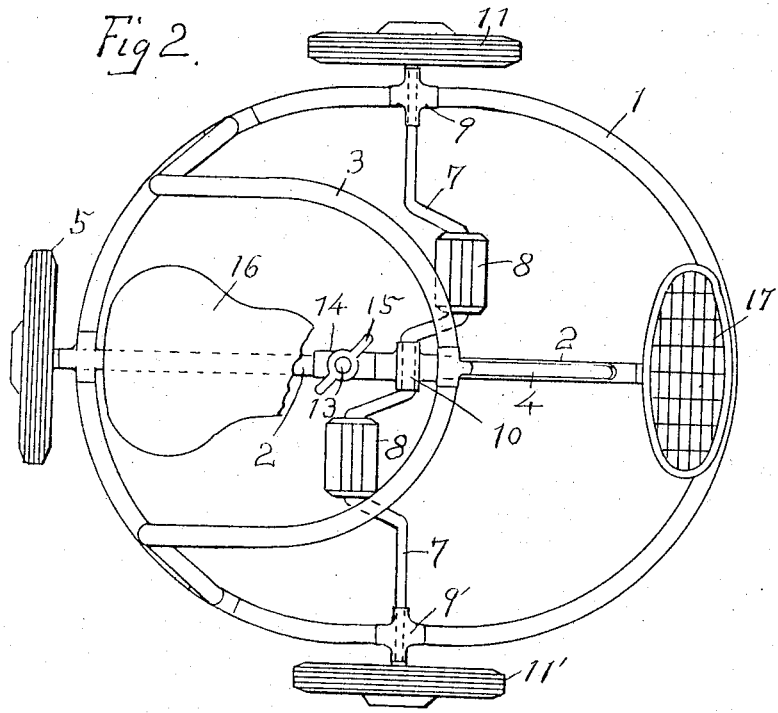
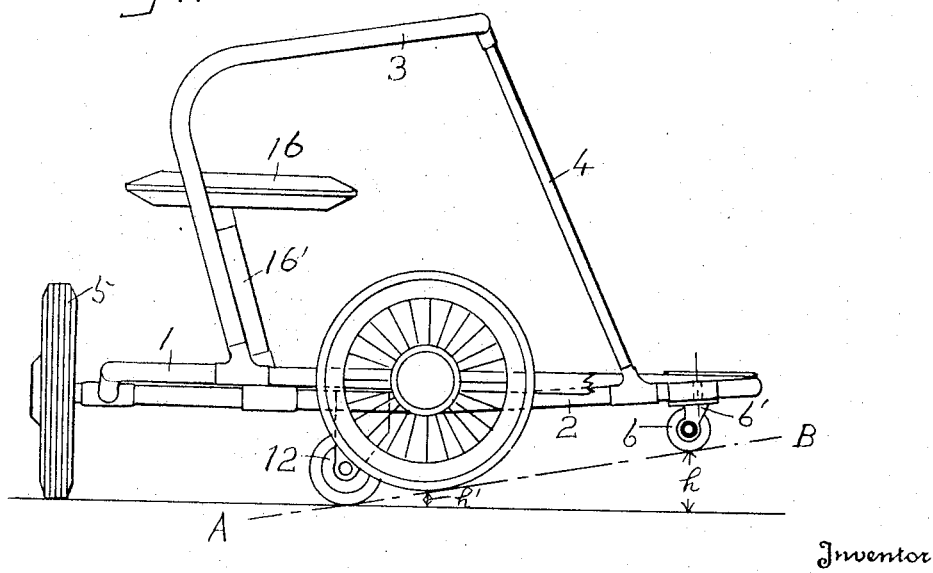
Inventor
Yoshio Goto,
By Pierce, Scheffler & Parker
his Attorneys

United States Patent Office 3,306,627
Patented Feb. 28, 1967

3,306,627
RIDER-PROPELLED EXERCISING VEHICLE
Yoshio Goto, 27 Sugiyama Odawara, Hara-machi, Japan
Filed Feb. 1, 1965, Ser. No. 429,344
1 Claim. (Cl. 280—259)

The present invention relates to an athletic vehicle for children and women, especially for babies or infants who are to pass time under guard indoors or garden being kept from dangers on street. It can also be equally utilized by women for their physical training as well as calisthentics.

The vehicle in accordance with my invention can render the rider various changeful and exciting motions which have never been experienced by people. It can revolve clockwise or anticlockwise according to the rider's will. It can proceed to the front or retire backward as well as meander in a zigzag line. These changeful motions are simply made merely by shifting of the rider's weight without using any handle or steering means, so that it is quite novel and original as well as exciting to the user.

The construction, function and merits of the invention will be more particularly understood by the following explanation with the accompanying drawing.

FIG. 1 is the side view and FIG. 2 is the plan of a working example in accordance with the present invention. In this case, the base frame 1 is constructed with metal pipe shaped oval or elliptical. Along the longitudinal axis of the same, a center pole 2 is fixed firmly at the both ends to the base frame 1. A curved hand-rail 3, closed in front and open in back is also fixed at its both ends to the rear part of the base frame. A strengthening support 4 is provided to connect the front portion of said hand-rail 3 to the front part of said center pole 2.

At the rear end of the center pole 2, a large wheel 5 is rotatably attached sidewise as shown in the drawing, while at the front end of the same a front castor 6 is provided with its rotatable support 6'.

Along the transverse axis of said base frame 1, a crank shaft 7 is provided with pedals 8, 8 perpendicularly to said center pole and supported on the bearings 9, 9' and 10. At the both ends of the crankshaft 7, side wheels 11, 11' are fixed. At the rear side of the crankshaft on the center pole 2, a moderate size center castor 12 is provided, having a vertical shaft 13 fitting in a bearing 14 upon which the shaft can be locked by a butterfly nut 15 if desired, to fix the castor to a direction wanted. 16 is a saddle fixed at the top of a pole 16' extending from a rear part of the center pole 2.

When a rider sits on the saddle 16, the vehicle will rest horizontally, the center of the rider's weight falling in the zone between the castor 12 and the wheel 5 as seen in the drawing FIG. 1. In such state as mentioned above, the vehicle is so constructed that the side wheels 11 and 11' hang in the air by a small distance $h'$ and also the front castor 6 by a larger distance $h$ from the ground. It will be preferable that the tip of the front castor 6 is made to lie in a plane tangent to the side wheels 11, 11' and the center castor 12. Thus when the vehicle inclines forwardly by shift of the rider's weight frontward, the rear wheel 5 will be entirely raised from the surface of the ground to make the vehicle go forward, the total weight of vehicle including the rider's being supported by the pair of side wheels 11, 11' and two castors 6 and 12 quite stably.

When the vehicle is in the position as seen in FIG. 1 and further if the rider's weight is shifted to the right hand side, he can drive the vehicle anticlockwise, and vice versa, and if the rider's weight is shifted alternately to the right hand side and the left hand side in turn, the vehicle will proceed along a zigzag course due to the alternate contact of the wheels 11 and 11' with the ground.

The numeral 17 is a step which is used when this vehicle is utilized as a skating wheel by a user pushing in the opposite direction. The center castor 12 can be fixed to run at a fixed direction if wanted. But these arrangements, being not essential to this invention, can be omitted if desired.

Since the vehicle constructed in accordance with my said invention can make various changeful motions as stated above; it will make an exciting and tasteful athletic implement for children as well as women who wish health and also physical beauty.

The details of design of the vehicle will of course be able to be changed without deviating from the scope of this invention expressed in the claim.

I claim:

A vehicle comprising a symmetrical base frame having median longitudinal and transverse axes, a front castor mounted to said frame adjacent to the front end thereof on an axis in the vertical plane through said longitudinal axis, a rear wheel rigidly mounted to said frame adjacent to the rear end thereof on an axis in the vertical plane through said longitudinal axis to rotate in a plane perpendicular to said longitudinal axis, a transverse crankshaft mounted to said frame substantially coincident with said transverse axis, side wheels mounted on the ends of said crank shaft for rotation in planes perpendicular to said transverse axis, a pedal on said crankshaft on each side of said longitudinal axis, a seat supported on said frame in the vertical plane through said longitudinal axis and behind the vertical plane through said transverse axis, a hand rail mounted on said frame and extending around the sides and front of said seat, a support extending from the front end of said hand rail to the front end of said frame and an adjustable center castor mounted to said frame in the vertical plane through said longitudinal axis between said seat and said crankshaft, said front castor, center castor and side wheels being positioned to engage a plane extending downwardly and rearwardly relative to the plane through said longitudinal and transverse axes of said frame, said rear wheel and said center castor being positioned to engage a plane parallel to the plane through said longitudinal and transverse axes of said frame.

References Cited by the Examiner

UNITED STATES PATENTS

| | | | |
|---|---|---|---|
| 561,798 | 6/1896 | Lawson | 280—239 |
| 2,548,749 | 5/1951 | Stout | 280—282 |
| 3,096,100 | 7/1963 | Clarke | 280—282 |

KENNETH H. BETTS, *Primary Examiner.*